Feb. 12, 1935. W. E. RUTZ ET AL 1,991,177
WIPER FOR MACHINE WAYS
Filed Aug. 3, 1931

INVENTORS
WILLIAM E. RUTZ
RAYMOND M. WOYTYCH
BY
Chindahl, Parker & Carlson
ATTORNEYS Patented Feb. 12, 1935

1,991,177

UNITED STATES PATENT OFFICE 1,991,177

WIPER FOR MACHINE WAYS

William E. Rutz and Raymond M. Woytych, Fond du Lac, Wis., assignors to Giddings & Lewis Machine Tool Co., Fond du Lac, Wis., a corporation of Wisconsin Application August 3, 1931, Serial No. 554,796

12 Claims. (Cl. 308—5)

This invention relates to improvements in wipers for use in removing chips and other foreign matter from the guide ways of machine tools.

A general object of the invention is to provide a novel and improved wiper which is simple and inexpensive in construction, and which is reliable and efficient in operation.

A more particular object of the invention is the provision of a novel wiper which maintains close contact with the guide-ways and which automatically compensates for wear so as to require no attenton for long periods of time.

Other objects and advantages will become apparent from the following detailed description taken in connection with the accompanying drawing, in which.

Figure 1:
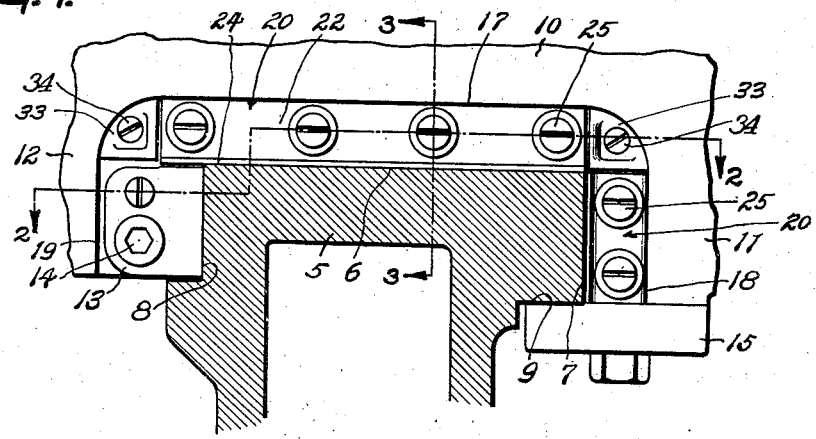
Figure 1 is an elevational view of a wiper embodying the features of our invention and shown in operative relation to one way and a fragment of a movable element on the way.

While the wiper comprising this invention is not limited for use on any particular type of machine, it is shown in the drawing, for purposes of illustration, as adapted for use on a machine tool having a guide-way 5 of substantially rectangular construction. The way 5 is in this instance provided with an upper bearing surface 6, side bearing surfaces 7 and 8 and a lower surface 9.

Figure 2:
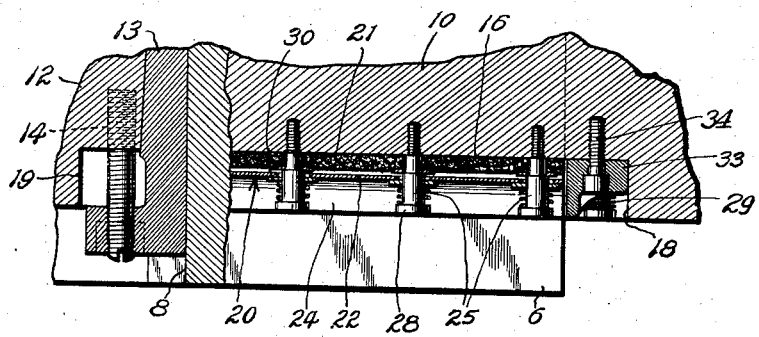
Fig. 2 is a sectional view taken approximately along line 2—2 of Fig. 1.
Figure 3:
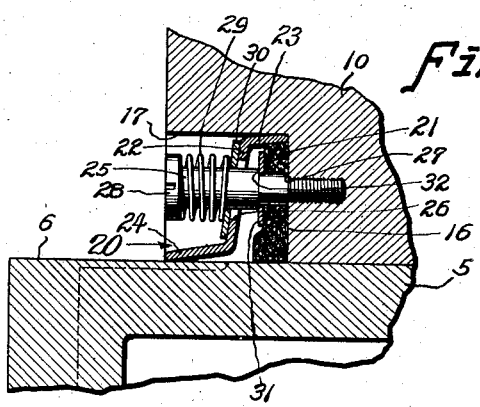
Fig. 3 is a fragmentary sectional view taken in the plane of line 3—3 of Fig. 1.

Slidable on the way 5 is a table or carriage 10 having depending flanges 11 and 12 forming a channel for receiving the way. The carriage bears directly against the way 5 on the upper surface 6 and the side surface 7 but is spaced from the surface 8. As can be seen in Fig. 2, the flange 12 is formed with a slight taper longitudinally of the way. Interposed between the flange 12 and the way 5 is a tapered gib 13 adjustable longitudinally by means of a screw 14 to take up any play that may develop between the way and the carriage 10. A gib plate 15 is bolted to the lower edge of the flange 11 and bears against the lower surface 9 to hold the carriage 10 slidably on the way 5.

To prevent chips or other foreign matter from entering between the bearing surfaces of the way 5 and the carriage 10, the wiper is mounted on the end of the carriage to brush the way free of foreign matter as the carriage reciprocates. In this instance, the wiper is partially concealed in a recess formed in one end of the carriage proper and depending flange 11, and defines an inverted U-shaped space about the way 5. The recess, in cross-section, is substantially rectangular, forming an inner end wall 16 perpendicular to, and a top wall 17 and side walls 18 and 19 in parallel spaced relation to, the respective bearing surfaces 6, 7 and 8 of the way 5.

The wiper in its preferred form comprises sections for coaction with various of the bearing surfaces 6, 7 and 8, and in the present instance, wiper sections for the surfaces 6 and 7 are shown. The wiper sections are alike in structural details, except that each is of a length sufficient to extend completely across its associated bearing surface, and hence a detailed description of the top section, coacting with the walls 16 and 17 and the surface 6, will also serve for the side section, coacting with the walls 16 and 18 and the surface 7, with like parts of the sections identified by the same reference characters. Thus, the top section comprises a rigid scraper member 20 with one longitudinal edge in sliding contact with the associated bearing surface 6 to loosen and remove the large particles, and also has a conformable member 21 for removing the finer dust particles. To permit of economical manufacture, ease of assembly and automatic adjustment to compensate for wear, the member 20 is pivotally supported in the recess, and is urged yieldingly into engagement with the associated bearing surface 6 of the way 5.

To this end, the scraper member 20 is formed from a generally rectangular plate which has a substantially upright intermediate or web portion 22 and reversely bent upper and lower flanges 23 and 24 along its opposed longitudinal margins. The web portion 22 preferably is slightly less in width than the width of the space between the associated bearing surface 6 of the way 5 and the opposed parallel surface 17 of the recess, and preferably is slightly inclined toward the way and outwardly relative to the inner end wall of the recess. The flanges 23 and 24 preferably are inclined to the web portion 22 at an angle slightly less than 90°.

The scraper member 20 is disposed in the upper portion of the recess with the upper flange 23 directed inwardly and pivotally bearing along its free edge in the inner corner of the recess at the junction of the inner end wall 16 with the perpendicular wall 17, and with the lower flange 24 directed outwardly and slidably bearing along its free longitudinal edge against the associated bearing surface 6. The flange 24 thus in effect constitutes a blade pivotal about the edge of the flange 23.

The member 20 is retained in position within the recess by means of a pluralty of spaced bolts 25 which extend loosely through longitudinally spaced apertures 26 formed in the web 22, and which are threaded at their inner ends into the inner wall 16. Each bolt 25 is formed at the base of the threaded portion with a shoulder 27 which is drawn tightly against the wall 16 to secure rigidity, and is provided at its outer end with an enlarged head 28. Encircling each bolt 25 and acting in compression between the head 28 and the web 22 is a coiled spring 29 which yieldably urges the flange 24 to bear against the surface 6 of the way.

With the scraper member 20 shaped and mounted as just described, it is apparent that wear of the blade portion 24 will automatically be compensated for, thus insuring efficient operation over a long period of time without attention. The simplicity of the parts and assembly also assures minimum cost of production and ease of attachment.

Chips or other foreign matter are prevented from entering through the apertures 26, which are made larger than the bolts 25 to permit of relative movement between the bolts and the scraper member, by washers 30, one fitting snugly about each bolt 25 and inserted between the spring 29 and the web 22.

The surfaces of the way are also cleaned, particularly of fine dust particles and oil, by the conformable member 21. This member, which may consist of a rectangular strip of felt or any similar matted material, is placed against the inner wall 16, with one of its longitudinal edges bearing against the surface 6 of the way and with the other edge disposed against the flange 23. The strip 21 is retained in position by means of washers 31, one on each of the bolts 25. A shoulder 32 formed on each bolt 25 provides a seat for the associated washer. It is evident that the conformable member 21 in addition to removing foreign matter also serves to maintain a uniform film of lubricant on the surface of the way.

As stated in the foregoing, the side section of the wiper is the same in construction as the top section. Since it serves to clean the outer side bearing surface 7, the side section obviously is disposed vertically, and of a length conforming to the height of the way 5, and is associated with the walls 16 and 18.

The top and side sections terminate flush with the outer upper edge of the way 5, and the top section does not extend beyond the tapered gib 13. Hence, the wiper sections do not occupy the corners of the recess, but define substantially triangular spaces opening to the spaces back of the wiper members 20. To prevent the entry of foreign matter, a triangularly-shaped bracket or block 33 is secured as by means of a bolt 34 in each of the end spaces to seal the ends of the wiper sections.

We claim as our invention:—

1. In a machine tool having a guide-way and a carriage reciprocable thereon, a wiper carried by said carriage comprising, in combination, a metallic scraper member pivotally supported on said carriage and yieldably urged to bear against said guide-way, and a felt strip mounted on said carriage to bear against said guide-way intermediate said scraper and said carriage.

2. In a machine tool, in combinaton with a guide-way and a carriage slidable thereon, said carriage having a shoulder at one end extending transversely of and in opposed relation to said guide-way, a rigid metallic member disposed between said shoulder and said guide-way in edgewise relation and yieldably urged to bear against said guide-way, and a conformable member secured to said carriage and bearing against said guide-way immediately adjacent the end of said carriage.

3. In a machine tool, in combination with a guide-way having a bearing surface and an element slidable thereon, said element having a recess at one end closed on one side by said guide-way and the opposite side forming a shoulder facing said bearing surface, a strip secured within said recess to said element and in frictional engagement with said bearing surface, a plate in said recess extending transversely of said guide-way in edgewise relation to said bearing surface, said plate being wider than the width of said recess between said shoulder and said bearing surface, and means yieldably urging said plate into said recess into engagement with said shoulder and said bearing surface.

4. In a machine tool, in combination with a guide-way having a bearing surface and an element slidable thereon, said element having a recess defining a corner and closed on one side by said bearing surface, a plate disposed transversely of said guide-way in edgewise relation to said bearing surface and having one edge fulcrumed in said corner, the opposite edge of said plate being removed from the first mentioned edge by a distance greater than the perpendicular distance from said bearing surface to said corner so as to rest against said bearing surface, and means yieldably urging said plate into the recess.

5. In a machine tool, in combination with a guide-way and an element slidable thereon, said element being formed at one end with a recess defining a seat and extending transversely of and immediately adjacent said guideway, a scraper member having an apertured intermediate web portion, a bent flange on one side edge of said web portion bearing in said seat, and a reversely bent flange on the other side edge of said web portion adapted to bear against said guideway, a bolt projecting through said apertured web portion into fixed engagement with said element, and a spring acting in compression between the head of said bolt and said scraper member to urge said member against said guide-way.

6. In a machine tool, in combination with a guide-way and an element movable on said guide-way, said element being formed along one end with a recess extending transversely of and directly over said guide-way, a scraper member disposed in said recess and bearing pivotally along one edge against said element and along the opposed edge against said guide-way, a plurality of spaced bolts extending loosely through said element, and a plurality of springs seated respectively on said bolts and impinging against said member to urge said member pivotally against said guideway.

7. For a machine tool having a guide-way and an element slidable thereon, a wiper comprising, in combination, a scraper plate adapted to be supported on said element for pivotal movement, said scraper plate being centrally apertured and having a flange forming a blade adapted to bear against said guide-way, a strip of felt adapted to be positioned to bear against said guide-way intermediate said scraper plate and said element, a shouldered bolt adapted to project loosely through said scraper plate and through said strip and to be threaded into said element, a washer on said bolt for retaining said strip in position, and a spring on said bolt for acting in compression between the head of said bolt and said scraper plate for retaining said scraper plate in position.

8. In a machine tool, in combination with a guide-way and an element movable on said guide-way, said element being formed along one end with a recess extending transversely of and immediately adjacent said guide-way, a fabric strip mounted on said element within said recess and bearing against said guide-way, a plate bearing at one edge against said guide-way and at the opposed edge against the interior of said recess to substantially close the outer end of said recess, said plate having an aperture, a bolt projecting loosely through said aperture to retain said plate and strip in position a washer snugly fitting said bolt and overlying said aperture, and spring means acting against said washer to urge said plate against said guideway.

9. In a machine tool, in combination with a guide-way having relatively perpendicular bearing surfaces, and an element slidable thereon and having a recess formed in one end extending about said guideway and bounded by said bearing surfaces, a rectangular scraper plate for each of said bearing surfaces, each plate bearing along one edge against the interior of said recess and along the opposed edge against the associated bearing surface, yieldable means retaining said plates in position, and a filler interposed between the contiguous ends of said scraper plates.

10. In a machine tool having a guide-way, a carriage slidable thereon and having a recess formed in one end, a wiper in the recess having a metal scraper plate bearing along one side edge in the inner corner of said recess and extending outwardly to bear along said guide-way at the other side edge, and means fixed on said carriage and extending across one end of said plate to prevent foreign matter from entering past said end into the space between said plate and said carriage.

11. In a machine tool, in combination with a guide-way and an element slidable thereon, said element defining a shoulder extending transversely across said guide-way, a scraper member bearing pivotally along one edge against said shoulder and bearing along its opposite edge against said guide-way, and resilient means acting to hold said member seated in position against said shoulder and tending to urge said member pivotally against said guide-way.

12. In a machine tool, in combination with a guide-way and an element slidable thereon, a scraper member movably mounted on one end of said element for bearing engagement with said guide-way, said member coacting with said guide-way and said end of said element to define therewith a space sealed against the entry of chips and foreign matter past or through said member, and an oil absorbent strip secured in said space in wiping engagement with said guideway.

WILLIAM E. RUTZ.
RAYMOND M. WOYTYCH.